(12) United States Patent
Palmer

(10) Patent No.: US 9,571,891 B2
(45) Date of Patent: Feb. 14, 2017

(54) SYSTEM AND APPARATUS ENABLING CONVERSATION BETWEEN AUDIENCE AND BROADCAST OR LIVE-STREAMED MEDIA

(71) Applicant: Brooke Curtis Palmer, San Diego, CA (US)

(72) Inventor: Brooke Curtis Palmer, San Diego, CA (US)

( * ) Notice: Subject to any disclaimer, the term of this patent is extended or adjusted under 35 U.S.C. 154(b) by 0 days.

(21) Appl. No.: 14/788,568

(22) Filed: Jun. 30, 2015

(65) Prior Publication Data
US 2017/0006344 A1    Jan. 5, 2017

(51) Int. Cl.
*H04N 21/475* (2011.01)

(52) U.S. Cl.
CPC ...... *H04N 21/4758* (2013.01); *H04N 21/4756* (2013.01)

(58) Field of Classification Search
CPC .................. H04N 21/4758; H04N 21/4756
See application file for complete search history.

(56) References Cited

U.S. PATENT DOCUMENTS

| | | | | |
|---|---|---|---|---|
| 2006/0001657 A1* | 1/2006 | Monney | ............. | G06F 3/03543 345/184 |
| 2009/0322498 A1* | 12/2009 | Yun | ............. | G06F 3/016 340/407.2 |
| 2013/0041905 A1* | 2/2013 | Davies | ............. | G06Q 30/00 707/748 |
| 2014/0098038 A1* | 4/2014 | Paek | ............. | G06F 1/1692 345/173 |

* cited by examiner

*Primary Examiner* — Benjamin R Bruckart
*Assistant Examiner* — Tien M Nguyen
(74) *Attorney, Agent, or Firm* — Dunlap Bennett & Ludwig PLLC

(57) ABSTRACT

Disclosed is a system, method and apparatus for opinion polling of broadcast or live streamed media. The scalable system enables real time analysis and display of continuously updated audience opinion data. A computing device with a touchscreen may be used to input personal opinion, view program content, and observe compiled audience reaction, simultaneously. Content and reaction may also be viewed separately. Granularity of data is substantially improved as is nuanced comprehension of responses. Iterative opinion input is enabled, in both numerical rating and textual comment. Unsolicited, top-of-mind audience reaction is accommodated while latency is reduced to a near conversational level. A rich consumer data base may be correlated to opinion. The apparatus enabling system function communicates tactilely to the user the opinion being output by the device.

8 Claims, 5 Drawing Sheets

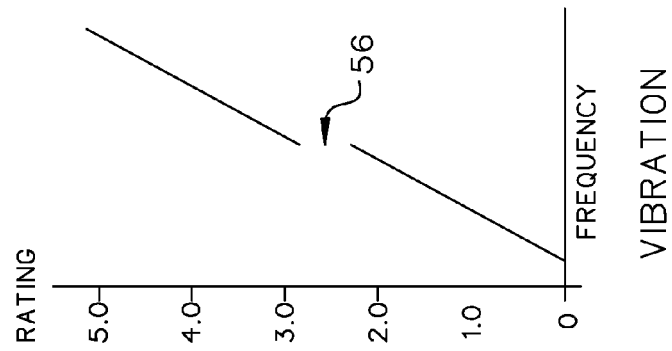
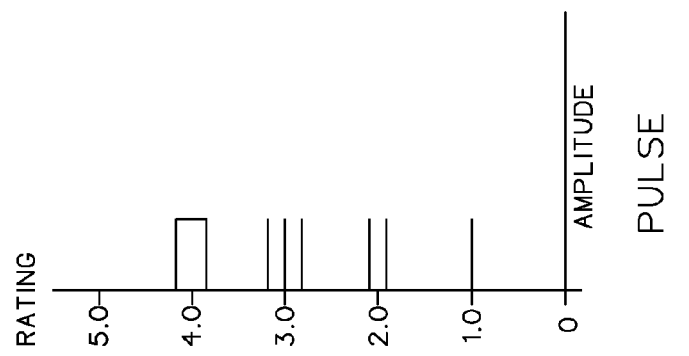
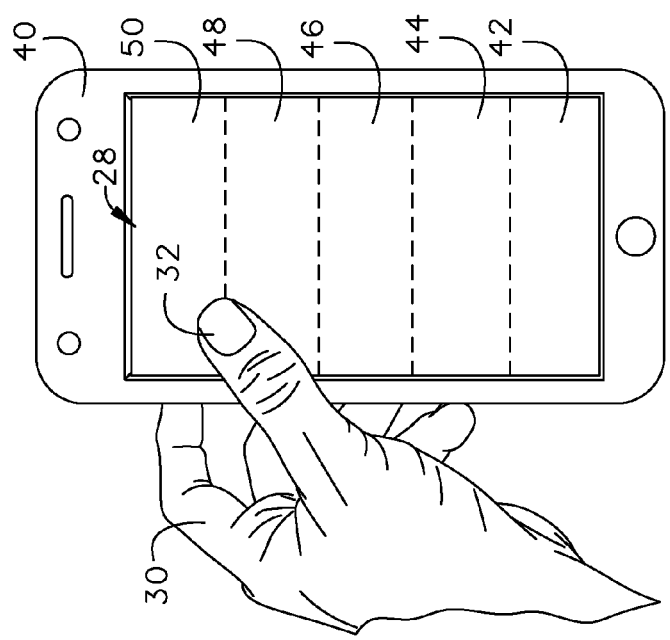

SYSTEM AND APPARATUS ENABLING CONVERSATION BETWEEN AUDIENCE AND BROADCAST OR LIVE-STREAMED MEDIA

TECHNICAL FIELD

The system and apparatus described herein relates to the field of multimedia programming, more particularly, to the field of voting and polling during live multimedia programming.

BACKGROUND

Many efforts have been made to enable audience feedback to broadcast and entertainment industry programming, to evaluate consumer reaction and opinion of the content. Industry and academic researchers have devised schemes to monitor and analyze audience reaction. Results are typically described as feedback, the essential first step in gauging consumer attitude, but not close to describing the cultural ambiance. While the monitoring may be in real-time, the analysis is usually after the fact. The data collected is generally opaque, and lacks diversity and control.

In Hollywood, The Preview House shows new films and TV pilots to a hundred or more invitees, to gauge their reaction before a film or program is finally edited or released. In some cases, alternate scenes or endings are tested in an attempt to tune the production to the viewers' tastes. Here, participants sit in luxury seating with a "joystick" input device built into the armrest. Data are compiled and may be viewed in real-time or stored and analyzed later, although resulting sample size and diversity limit comprehension. You may have determined whether a scene is liked or disliked, but not the insight to know why or how to fix it.

In June, 2014, CNBC launched a program enabling real-time viewer polling with on-screen display of results during the discussion, a significant step forward in audience communication and feedback. The audience is directed to a website to vote yes or no on the issue being discussed. Running results are tabulated and displayed live, in percentage terms. Now, sample sizes may be substantial, and a measure of audience interaction is introduced in that participants can view the running display of results.

There remains a need in the art for an apparatus and system that can gather opinion information from multimedia viewers that does not interrupt their viewing experience without producing excessive noise, annoyance, or demanding excessive visual attention.

More broadly, with the present invention, it is possible to gather and aggregate national or regional audience input, display the data as part of the broadcast content, discuss and analyze results with the audience, question the audience further in detail, offer additional argument and even persuasion, all in real-time. In other words, a broadcaster may have a conversation with a national audience—with the intimacy of a focus group. Of additional benefit is the rich data base generated by participant registration, and data tabulated on multiple dimensions: geographic, demographic and socio-economic.

BRIEF SUMMARY

A user interface for live opinion polling includes a computing device with a touchscreen, of any size from a laptop to a smartphone. A television may also be required, if the program content is broadcast only, and not livestreamed to the device. The touchscreen may include a graphical user interface for producing graphic display on the touchscreen and utilizes a digital slide switch (FIG. 1) for highly granular user input transmitted to the content provider. It also displays the mean and distribution of opinions of all participating viewers, as compiled and rebroadcast or streamed by the content provider along with the live program. The user interface device further includes a feedback generator that vibrates the device housing based on the precise numeric value of the users opinion that equates to the position of an input element (for example, the user's digit or thumb) on the touchscreen. This is the tactile sensory, non-visual communication medium between the device and the user. In one embodiment, the vibrational feedback is a series of pulses wherein a unique pattern of pulses corresponds to a specific numeric value, so the user can "feel" the output without the distraction of looking away from the content, (FIG. 2). In another embodiment, the vibrational feedback is of increasing or decreasing frequency that can be felt or heard, and that corresponds to changing the input element position, up or down, as the viewers opinion of the program content varies, (FIG. 3). In another embodiment, the vibration stops around the neutral input position, so the user will "feel" the neutral opinion position, for reference. This replaces the self-centering feature of a mechanical joystick. Thus, tactile sensory feedback is the human factor enabling intuitive operation.

The data representing the user's opinion may be transmitted via the platform continuously or may be sampled at a rate determined by the content provider. In one embodiment, transmission may be triggered by change, or rate of change of data input. Transmission may also be pushed, or forced by the user. In this embodiment, an enthusiastic user may vote repeatedly, or "Send Again", by lifting the digit from the touchscreen. This action saves the last value (opinion) for a short time, and transmits that value again every time the touchscreen is tapped.

To be clear, the stream of opinion data transmitted by all participants to a content provider using the system, is compiled and manipulated by the content provider and retransmitted (e.g. broadcast nationally) along with program content. Thus, the depiction embodied in FIG. 4 is typical of what all television viewers would see, not just on participants' devices. This acts as an incentive for viewers to participate. It also rewards participants with entertaining hardware, enlightening real-time graphics, the satisfaction of voicing their opinion.

System displays depicted in FIG. 4 show history and current mean opinion of participating viewers. The latter rewards users with the ability to compare their opinion with others'. They may also attempt to influence the overall result with the Send Again feature. Another display shows the distribution of user opinion across the rating scale and uniquely updates the display dynamically in real time as user opinion data is received or updated in response to changing opinion.

FIG. 8 depicts a sample wordcloud, a separate display. The invention uniquely employs a wordcloud to elicit and organize independent user comments online. Users submit a word or short phrase, the system processes the data, and generates a unique wordcloud in near-realtime. This allows perhaps thousands of comments to be analyzed and consolidated in seconds. If the program is a traditional commercial broadcast, the host may request comments before a commercial break. The wordcloud is generated during the break, then displayed and discussed when the program resumes. In a unique embodiment, the wordcloud may operate throughout an entire segment and may even be updated in real time as participants, again attempt to influence the result. The invention uniquely empowers the audience to choose the issue it wants to discuss.

FIG. 9 illustrates the flow of data within the system. The system uniquely enables acquisition of opinion data from a large audience, dynamic display of the data in real time, and iterative opinion input in response to evaluation of that data. To accommodate data volume, user personal data is handled separately from user opinion data. Personal data may be sourced manually, or automatically at peak and trough opinion based on rate of change of input. For economy of data handling, "snapshots" of pertinent data may be stored for future reference.

In one embodiment of the present invention, a computing device for live opinion polling includes a touchscreen; a division of the touchscreen into a plurality of zones; and a haptic generator that provides a vibrational feedback to said computing device to discriminate each zone of the plurality of zones in tactile communication with a user.

In another embodiment of the present invention, the computing may include wherein each tactile communication of the input element to the touchscreen is defined by a contact point.

In yet another embodiment of the present invention, the computing device of above includes wherein the vibrational feedback is a unique vibration that corresponds to each zone of the plurality of zones.

In yet another embodiment of the present invention, the computing device of above includes wherein the vibrational feedback is a series of pulses, wherein the series of pulses comprises a unique pulse pattern associated with each zone of the plurality of zones.

In yet another embodiment of the present invention, the computing device of above includes wherein the plurality of zones comprises four zones: a first zone, a second zone, a third zone, and a fourth zone.

In yet another embodiment of the present invention, the computing device of above includes wherein the series of pulses comprises: one short pulse associated with the first zone, two short pulses associated with the second zone, three short pulses associated with the third zone, and a single, longer dash shaped pulse associated with the fourth zone.

In yet another embodiment of the present invention, the computing device of above includes wherein the plurality of zones define a numeric rating scale, wherein the first zone has the lowest numeric rating and the numeric rating scale progressively increases along or up the touchscreen in the direction of the fourth zone.

In yet another embodiment of the present invention, computing device of above includes wherein the vibrational feedback is a ramped vibration, wherein the frequency of the ramped vibration increases continuously when the contact point moves toward a zone of a higher numeric rating, and wherein the frequency of the ramped vibration decreases continuously when the contact point moves toward a zone of a lower numeric rating.

In yet another embodiment of the present invention, the computing device of above includes wherein the ramped vibration system provides a neutral zone wherein the frequency is approximately zero.

In yet another embodiment of the present invention, the computing device of above includes wherein the first zone is associated with a numeric rating scale ranging from approximately 0.0 to approximately 1.0, wherein the second zone is associated with a numeric rating scale ranging from approximately 1.0 to approximately 2.0, wherein the third zone is associated with a numeric rating scale ranging from approximately 2.0 to approximately 3.0, and wherein the fourth zone is associated with a numeric rating scale ranging from approximately 3.0 to approximately 4.0.

In yet another embodiment of the present invention, the computing device of above includes wherein the neutral zone is associated with a rating scale ranging from approximately 2.3 to approximately 2.7, whereby confirming to the user their opinion output.

BRIEF DESCRIPTION OF THE DRAWINGS

FIG. 1 depicts a smartphone being used as the system's slide switch for data input, and shows the input zones for the nominal 1 to 5 rating scale;

FIG. 2 depicts the pulse vibration scheme informing the user of the approximate rating being output without looking at the screen;

FIG. 3 depicts the ramped vibration scheme with a void denoting the central, neutral zone, indicating a neutral opinion;

DETAILED DESCRIPTION

Figure 4:
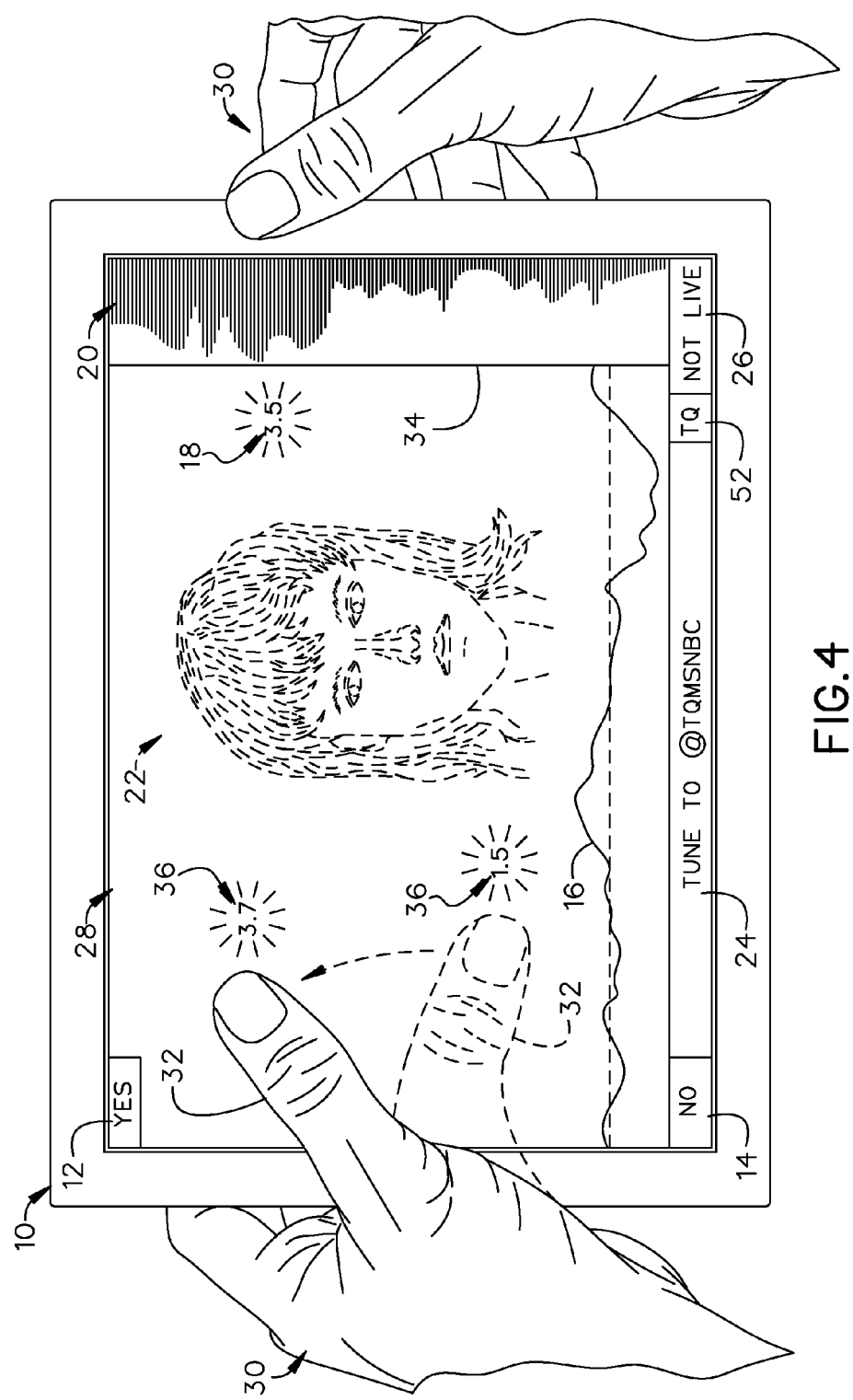
FIG. 4 illustrates an embodiment of the user interface with all analytical and graphical features deployed and in use on a tablet.

The system benefits of the current invention are apparent in multiple programming scenarios: news, opinion, debate, game shows and advertising. A universal template is provided to mix and match features and displays, to meet the needs of the content provider (hereafter, alternatively known as broadcaster). With dual-level subscriptions, elementary participant data may be included in broadcaster's primary license. A rich database is generated when users wish to input text comments for wordcloud where the secondary, more detailed registration is required. This database may be maintained separately on the present invention's resident platform and made available to the broadcaster through a secondary license. While the present invention is primarily intended for live streams or broadcasts, it may be used for any content with a time stamp.

The present invention may include at least one computing device 10 with a touchscreen 28. Each computing device 10 may include any computer having at least one processing unity electronically connected to a form of memory including, but not limited to, a desktop, laptop, and smart device 40, such as, a tablet, smart phone, smart watch and the like. The computing device 10 may include a program product including a machine-readable program code for causing, when executed, the computer to perform steps. The program product may include software which may either be loaded onto the computer or accessed by the computer. The loaded software may include an application on the smart device 40. The software may be accessed by the computer using a web browser. The computer may access the software via the web browser using the internet, extranet, intranet, host server, internet cloud and the like. The computing device 10 may be included on a platform 60 adapted to transmit output collected by the touchscreen 28 to a third party, usually the content provider, for retransmission.

The touchscreen 28 may include a graphical user interface for producing graphic and/or visual displays on the touchscreen 28, that a user can control through simple or multitouch gestures by touching the touchscreen 28. The computing device 10 may include a haptic generator that provides feedback. The feedback may be signals, such as vibrations, and/or properties of signals, such as frequency. The feedback may correspond to a contact point of a user's input element 32 on the touchscreen 28, such as when the user's thumb tactilely communicates with the touchscreen 28. In other words, the contact point may include the tactile communication between the touchscreen 28 and the input element 32. The feedback may correspond to a relationship between two or more contact points over a predetermine time. In certain embodiments, the touchscreen 28 may be coupled to the computing device by a housing.

A key component of the present invention's apparatus is the slide switch, whose unique tactile feedback is enabled by the device's haptic vibration generator. Innovative features and displays further extend and enhance system utility.

FIG. 1 illustrates the slide switch on a smartphone 40 with the touchscreen 28 divided into five zones: 42, 44, 46, 48, and 50. The zones denote a numeric rating scale, for instance a nominal 1 to 5 rating system, 5 being best. The current rating (output) may be determined by a contact point between the input element 32 and the touchscreen 28. The input element 32 may include a special stylus/pen, at least one of the user's digit, and the like. In actuality, the range is 0.1 to 4.9. Whole integers, 0 and 5, are reserved for No and Yes buttons, (FIG. 4, items 14 and 12, respectively). On this scale the mean, 2.5, represents a neutral opinion. The zones 42, 44, 46, 48, and 50 may be on an invisible layer on the touchscreen/touchscreen 28 so the content is not obscured. In an alternative embodiment, the slide switch could allow input in two dimensions, vertical and lateral. In this embodiment, the range would be a map, looking like a target, with the central "bulls eye" representing the neutral area around 2.5.

For a smaller device, it is assumed that the input scale may occupy the entire vertical dimension of the touchscreen 28. With a larger device like a tablet, the input scale would use only a portion of the touchscreen 28, due to the ergonomic range of movement of the thumb. After launch, the range of the input scale should be customizable to individual users. In this embodiment, the natural arc of movement of the thumb defines the input range, makes usage more comfortable, and personalizes the application.

The touchscreen 28 may be adapted to transmit to the broadcaster the precise value of each contact point on the touchscreen 28. (Example: FIG. 4, item 36, user output equals 3.7). To communicate to the user 30 the approximate value being output, without looking at the screen, the haptic generator of the computing device 10 pulses vibrations when the input element 32 is moved from zone to zone.

FIG. 2 illustrates the pulsing scheme. One short pulse indicates movement into first zone 42 (i. e. 1.0). Two short pulses indicate second zone 44. Third zone 46 feels like "dot dot dot" in Morse code. Fourth zone 48 feels like "dash" in Morse code (i. e. 4.0). Four haptic elements are judged the maximum tactilely discernible in a pulsing scheme. As a reminder to the user 30, the haptic generator also gives the appropriate pulse periodically if the input element 32 has not been moved for some period of time, perhaps every 10 seconds.

FIG. 3 illustrates a second haptic scheme, a ramped vibration, like a hum. When the user 30 wishes to change opinion (output), he/she moves the input element 32 in the desired direction along the touchscreen 28. The vibration frequency may increase as the input element 32 moves increases along the rating scale represented by the division of the plurality of zones along the touchscreen 28, and the frequency decreases when the input element 32 decreases along the same rating scale. In certain embodiments, the rating scale may be non-numeric, binary scale; for instance, the rating scale may be divided into "Yes" and "No", wherein the vibration frequency may increase when moving up toward "Yes", and decrease when moving down toward "No". No vibration occurs while the input element 32 is stationary. The ramp vibration system also informs the user of a neutral opinion being communicated to the user by not vibrating when moving the thumb between approximately 2.3 and 2.7, the neutral zone 56 on the ramp frequency curve. This is analogous to the self centering springs in a joy stick.

The overall level of vibration amplitude or intensity is user adjustable, as a compromise between user comfort and battery life.

FIG. 4 shows one embodiment of the touchscreen 28 on a tablet. The touchscreen 28 provides a history trace 16. The history trace 16 may be adapted to electronically represent on the touchscreen 28 a short time history of mean audience response, averaged over the last several seconds, to account for latency of various broadcast systems and audience response. The history trace 16 may reside in a layer on top of program content 22 without background, so as not to obscure the program content 22 in this embodiment, a news/opinion interview. The primary value of trace 16 is for reference, as it scrolls from left to right. At the end of the display period (e. g. one minute), past history disappears off the left edge of the screen and trace 16 continues to scroll.

The touchscreen 28 may provide an audience average 18. The audience average 18 may be adapted to electronically represent on the touchscreen 28 a numeric value of the current mean audience output (indicated as 3.5). Ideally, it should move up and down as the mean changes, and is displayed over program content 22, without background.

The touchscreen 28 may provide a NOT LIVE indicator 26. The NOT LIVE indicator 26 may be adapted to electronically represent on the touchscreen 28 an indication that the user 30 is not synchronized with the live broadcast and is viewing the program in a delayed mode; for example, when the NOT LIVE indicator 26 is ON. Out-of-sync viewer input is not be allowed.

The user output 36 (indicated as 3.7 and 1.5) is the numeric display of the user's precise current rating. In this embodiment, it is displayed next to the contact point between the user's input element 32 (or finger) and the touchscreen 28, and follows the thumb as it is moved up and down on touchscreen. In some embodiments, after the input element 32 is lifted from the touchscreen, the display lingers but fades during the period of time allowed by the "send again" feature (e. g. 5 sec).

FIG. 4 also shows the Yes and No buttons, items 12 and 14, respectively. These are activated as needed by the content provider, in lieu of the slide switch. FIG. 4 also shows the text message box 24, which may be used to give instructions like the content providers address, polling questions, or other information. The TQ button 58, the product's logo, serves as a toggle switch to return the device to normal operation, outside the application.

The touchscreen 28 may provide a dynamic distribution 20. The dynamic distribution 20 may be an array positioned along an edge of the touchscreen 28. The dynamic distribution 20 may be adapted to displays each individual user's input as it is received, distributed along the rating scale. This technique is traditionally used to illuminate an issue on which there is a large disparity of opinion. In this case, the display shows iterative values in that individuals may view the audience opinion, evaluate it, input data (vote) again, and then view the combined results moments later.

The indicator "lights" that comprise the dynamic distribution 20, turn ON and sustain in response to user input. The lights slowly fade to off, to maintain visibility. Due to latency in the system, a smoothing function may be required for clarity of graphics. To retain sufficient data for analysis, given reasonable storage capabilities, rate of change of input should be used to trigger storage of important "snapshots" in time.

Figure 6:
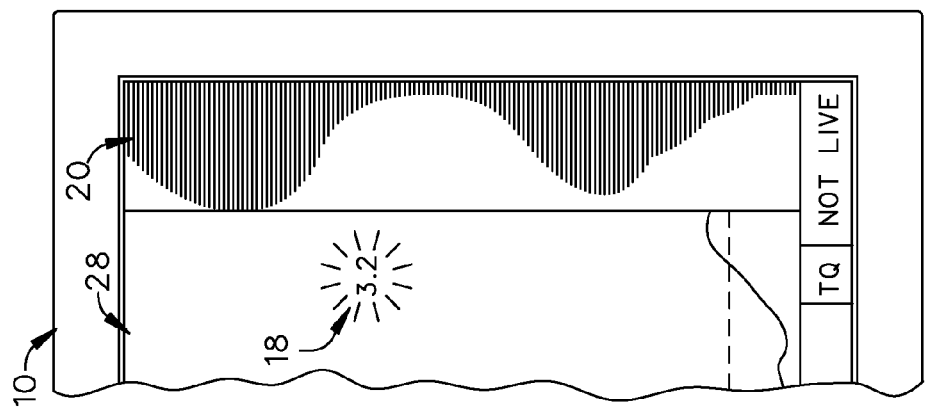
FIG. 5 and FIG. 6 illustrate how different audience opinion profiles can be, though their mean is the same, informed by the dynamic distribution window embodied in FIG. 4.
Figure 5:
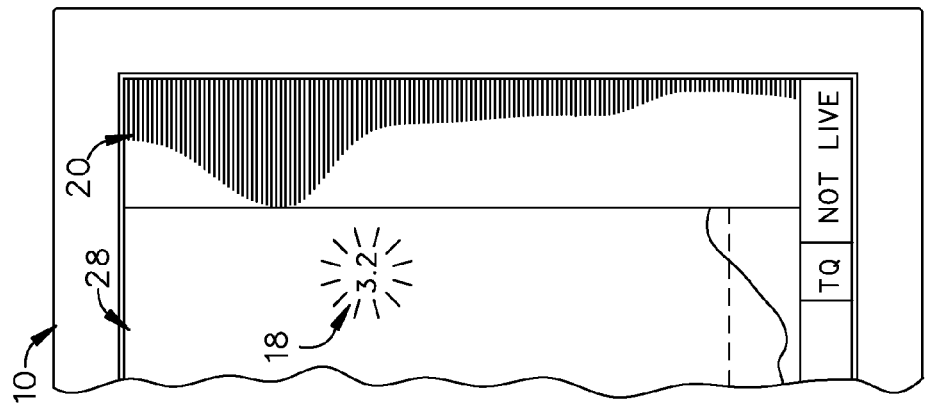

FIGS. 5 and 6 demonstrate the analytical value of the dynamic distribution 20. The two figures depict answers to different questions, though the audience average 18 may be the same for both (indicated as 3.2). In FIG. 5, a large portion of the audience is positive, many don't care and only a few are negative. FIG. 6 illustrates a bimodal distribution where many agree and disagree, and few are neutral. Clearly, the distribution is much more informative than the average alone.

In addition to its research value, the dynamic distribution 20 theatrically rewards users by displaying user input as "sparkling lights", as user's assume credit for individual data points, despite the reality of latency. The Send Again feature reinforces the reward.

Figure 7:
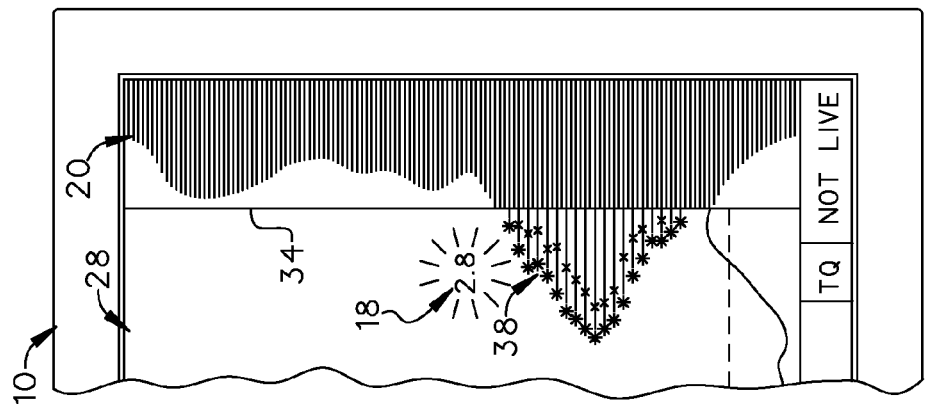
FIG. 7 approximates the appearance of the dynamic distribution when the volume of incoming user data exceeds restriction of the window.

FIG. 7 illustrates the appearance when the display is saturated, i. e. the volume of incoming data exceeds the accommodation of the display field bounded by the invisible border 34. At first contact with the field border 34, an individual data row increases in brightness, and continues to brighten with increasing data overload. Eventually, data explode past the display field 34 and into the broadcast content 22. The result is intended to look like a shower of fireworks a further theatrical reward. Since input volume is expected to vary dramatically from broadcast to broadcast, human intervention is required initially. In fact, volume may have to be amplified for low volume input broadcasts. Automatic level control to be added in a future embodiment.

Figure 8:
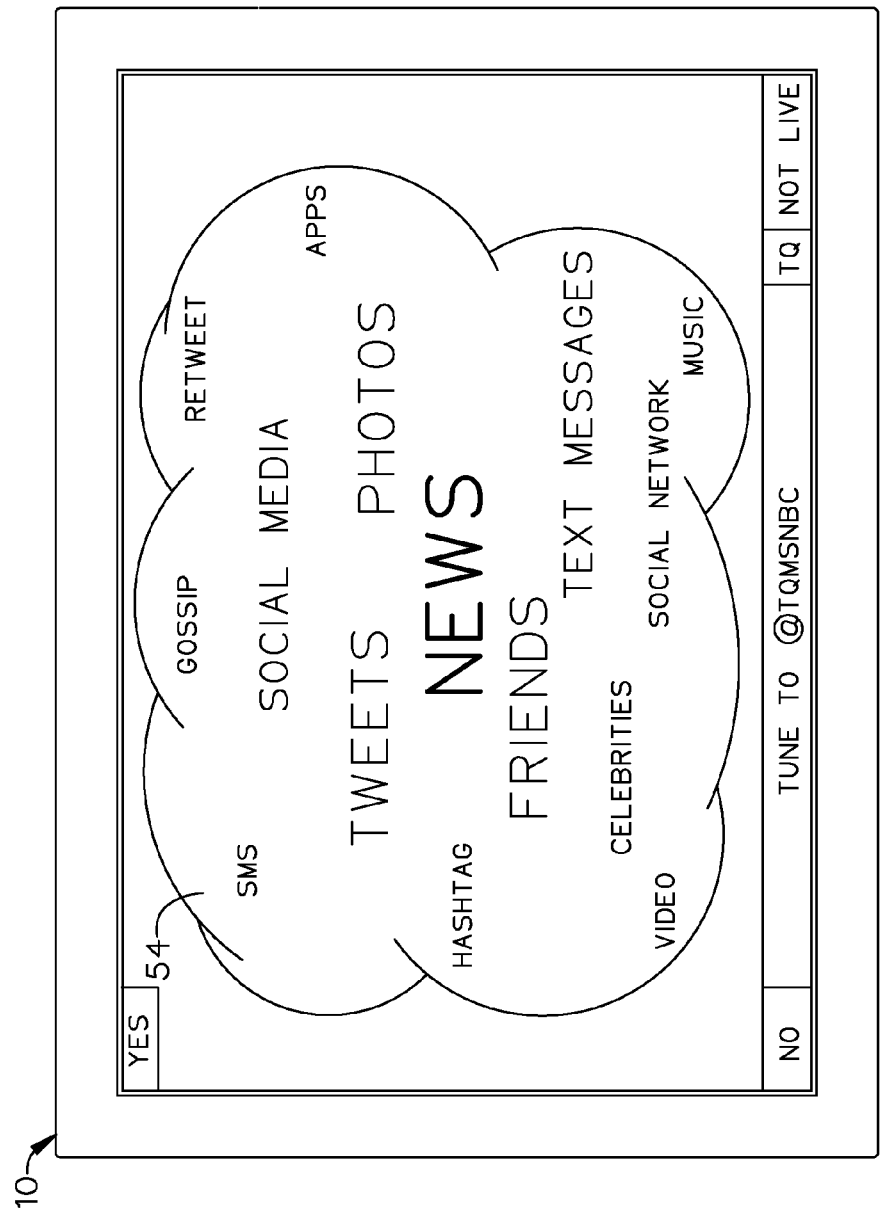
FIG. 8 depicts an exemplar wordcloud, a graphical display of user textual opinion sorted by frequency.

Thus far, the system has accommodated a large audience's opinions, increased granularity beyond simple yes/no responses, and introduced a method of display enabling iterative input and real-time analysis. It also allows basic conversation, in that questions may be posed verbally or in the text box 24, and simple audience responses discussed. To enable a true, nuanced conversation with a mass audience, to gauge their attitude or ambiance, a wordcloud 54 is employed. FIG. 8 depicts a sample wordcloud 54.

Wordcloud 54 may be simply a graphical representation for ranking input text message responses by frequency. The greater the frequency, the larger the font, the more prominent the placement of the text on the wordcloud map. When the content provider requests wordcloud input, participants text the word or short, familiar phrase (up to 16 characters) that best describes their opinion on the subject just presented. This elicits participant feedback without "fishing" for a particular response, or even forethought by the host. It may also be iterative in that a participant may be allowed to view a wordcloud created moments earlier, send input again, and thus influence a final result.

To accommodate the anticipated volume, several filters may be employed to facilitate automation. In various embodiments:

1. Require each allowed entry to be offered by more than one individual, and from more than area (zip code).
2. Preclude profanity and other distasteful words and terms.
3. Curating the data as a final check to ensure exclusion of inappropriate content before presentation.
4. Blocking troublesome participants.

When the unique wordcloud is ready for display, the conversation begins. The host may now comment on what a large audience is thinking, particularly on surprising responses. He/she may query the audience further with, "What if . . . " questions, watch the responses and query again. The host may introduce new evidence or argument, and even try to persuade with facial gestures, enabling true conversation.

System

Three key attributes define the system's unique utility: Live, real-time opinion acquisition from a large audience; dynamic display of data as received and as opinions change; and iterative new opinion input in response to evaluation of currently displayed data or new broadcast input.

When a viewer first watches a broadcast or stream using the system (here after called the Platform), along with the program content he/she sees the average audience opinion of that content (FIG. 4, item 18), and its dynamic distribution 20 displayed on the edge of the screen. The short history 16 may be displayed across the bottom for reference. From these displays the viewer immediately knows if the program is engaging and the nature of opinion, whether of-similar-mind or diverse. If the viewer wishes to participate, he opens the application on his device 10 and texts the address of the broadcaster, typically shown in the message box 24. The device 10 is now synced to the broadcaster.

Figure 9:
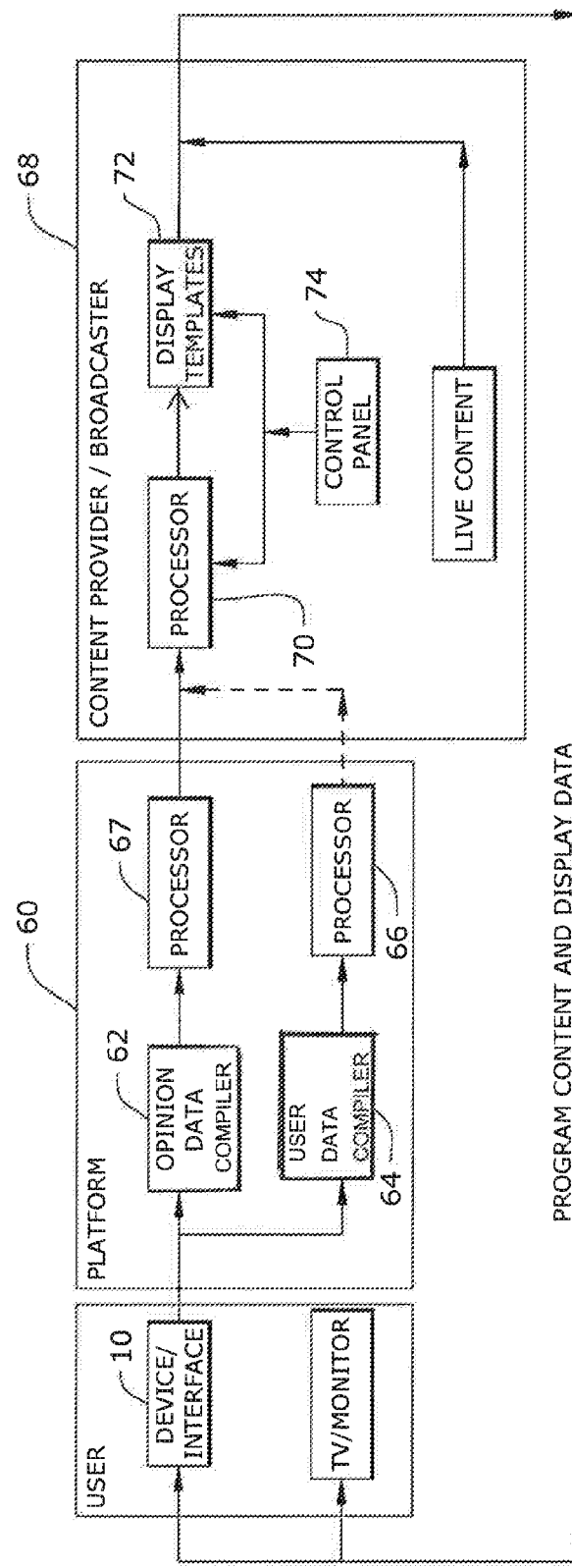
FIG. 9 illustrates the systems flow of opinion data and user personal data.

FIG. 9 shows how opinion data is transmitted to the opinion data compiler 62 and processor 67 within the Platform 60 and controllably passed through to the broadcaster 68. Data streams for each content provider are maintained separately by the Platform to accommodate potential highvolume. User data (geographic, demographic, socio-economic) are partitioned to a separate user data compiler 64 and processor 66 for analysis, conditioning and distribution.

In advance, the broadcaster 68 will have downloaded the graphics display package with templates 72 and their control panel 74 from the Platform. The broadcaster now receives conditioned opinion and user data streams separately for local processing and display. Incoming data are used to update the currently displayed data (old data) and overlaid on live content.

The display control panel 74 enables real time adjustment of display parameters. The broadcaster 68 may monitor continuously or sample data, and display the data in different ways. Continuous monitoring could be useful: where the broadcaster has an interest in a running opinion, e.g. evaluating a speech; or where the broadcaster wants to capture data from inactive viewers who respond only when the content catches their attention. The send again feature may be enabled to allow an enthusiastic viewer who sees the running results and wishes to reiterate his opinion in an attempt to influence the "final" result.

Assume an opinion/news program format where two sides of an issue are presented. As each pundant presents their arguments, opinion data is allowed continuously and monitored by the host. When a strong user reaction is indicated by the dynamic distribution 20, or anticipated based on a provocative pundant statement, the host may use the control panel 74 to instruct the host's processor 70 to save a "snapshot" of near term peak or trough data for subsequent analysis. When the statements have concluded, the host may then revisit the areas of greatest interest (the snapshots stored) and explain to the audience their polling results using detailed user data tabulations. The collection of snapshots may also be automated by triggering storage based on rate of change of input data, storing individuals' peak/trough data and compiling it.

Each snapshot is taken (opinion data stored) over a period of time encompassing the maximum/minimum opinion of all participants, voiced in response to a notable event. The intent is to capture relevant opinion data despite system latency and delayed participant reaction, or even host reaction. Peak data of a particular participants data stream is determined and used to compile desired metric of the event e.g. mean.

If more clarity is desired, the host may ask the pundants for additional argument and repeat the process. The host may also request a single rating only and using the control panel 74, restrict input to one per user. This forces participants to offer their best rating only, not one intended to overly influence the final result as when using the send again feature. Now, the impact of the additional argument may be evaluated.

If the host desires even further clarity, he may employ the wordcloud feature. Users wishing to submit wordcloud comments are subject to a secondary registration with greater scrutiny and personal data required. These are the individuals for whom a more detailed analysis is enabled including demographic and socioeconomic data.

Wordcloud may be deployed separately or concurrently with numeric opinion data input. Like numeric opinion data, wordcloud text submissions are sent directly to the broadcaster for local compilation, while user (personal) data is retained on the Platform compiler 64 and distributed to broadcasters separately.

Wordcloud submissions enable fresh unsolicited viewer commentary. Just as with usage of the numeric rating system facilitated through the slide switch, wordcloud enables high volume dynamic and iterative input. Using the control panel 74, the host may allow wordcloud input during the live program, or at its end before a commercial break. A newly formulated wordcloud may be presented to the audience when programming resumes. Or, the wordcloud itself may be the live program where participants are allowed to view the wordcloud as it is being updated in real time and vote (text) their agreement with comments submitted by others to reinforce their prominence, or add new comments. And, as with the numeric rating system, enthusiastic viewers may try to influence the result using the send again concept. In this case however, viewers would be required to retype text input, or use a "copy" tool before resending.

After hearing discussion of issues an audience of perhaps thousands is enabled to voice their opinion in their own words, not anecdotally but in a consolidated form. Thus, conversation is achieved.

System registration is via free application downloaded to a smartphone or tablet, initially requiring only an e-mail address and a postal zip code for permission to output numeric data using the slide switch. Text message submission for wordcloud requires additional user data and security measures including two factor authentication. This is justifiable based on the participants access to a nationally broadcast television signal, or live streamed internet content.

A broadcaster using the system, broadcasts the content along with the basic display and the address to which the viewer should "tune" to participate and to sync to the broadcaster. Automatic tune and sync should not be difficult to develop and incorporate, in the near future.

The user interface device is capable of single-handed operation, either left or right. It also does not interfere with or interrupt the audio or visual aspects of the streamed program being watched by participant 30. Users may also watch the program on a separate display or television, while using the system software as a user interface for only inputting opinion data (as shown in FIG. 4, without content), or they may watch the program on the same devices as they input their opinion (FIG. 4).

It is anticipated that participants may be distracted, but would like to re-engage immediately upon return. Or they may not view content continuously and only listen, but would like to respond immediately after hearing a particular comment. For these reasons, the system should remain connected and "on top", for quick input. Additionally, participants may tune away (change channels) during a commercial, and wish to re-engage immediately upon return. This must be accommodated.

The computer-based data processing system and method described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

Although the invention has been described with reference to embodiments herein, those embodiments do not limit the invention. Modifications to those embodiments or other embodiments may fall within the scope of the invention.

What is claimed is:

1. A computing device for live opinion polling, comprising:
   a touchscreen;
   a division of the touchscreen into four zones: a first zone, a second zone, a third zone, and a fourth zone; and
   a haptic generator that provides a vibrational feedback to said computing device to discriminate each zone of the four zones in tactile communication with a user, wherein each tactile communication of an input element to the touchscreen is defined by a contact point, wherein the first zone is associated with a numeric rating scale ranging from more than 0.0 to 1.0, wherein the second zone is associated with a numeric rating scale ranging from more than 1.0 to 2.0, wherein the third zone is associated with a numeric rating scale ranging from more than 2.0 to 3.0, and wherein the fourth zone is associated with a numeric rating scale ranging from more than 3.0 to 4.0, wherein the vibrational feedback provides a neutral zone wherein the frequency is zero, and wherein the vibrational feedback is a ramped vibration, wherein the frequency of the ramped vibration increases continuously when the contact point moves toward a zone of a higher numeric rating, and wherein the frequency of the ramped vibration decreases continuously when the contact point moves toward a zone of a lower numeric rating.

2. The computing device of claim 1, wherein the neutral zone is associated with a rating scale ranging from 2.3 to 2.7, whereby confirming to the user their opinion output.

3. The computing device of claim 1, further comprising a platform for transmitting each contact point to a third party.

4. The computing device of claim 3, wherein the third party is a content provider, and wherein each contact point corresponds to a reaction to content provided by the content provider.

5. The computing device of claim 4, wherein the provided content is being electronically represented on said touchscreen.

6. The computing device of claim 1, wherein a numeric value corresponding to each contact point is displayed on said touchscreen.

7. The computing device of claim 6, wherein a graphical representation of the numeric value is displayed on said touchscreen.

8. The computing device of claim 7, wherein a statistically analysis of a plurality of contact points is displayed on said touchscreen, wherein each contact point is a reaction to the content provided to a unique viewer.

* * * * *